(12) United States Patent
Ashar et al.

(10) Patent No.: US 10,982,722 B2
(45) Date of Patent: Apr. 20, 2021

(54) CLUTCH WITH SWIRL BREAKS

(71) Applicant: General Electric Company, Schenectady, NY (US)

(72) Inventors: Siddharth Navinchandra Ashar, Niskayuna, NY (US); Jason Winfred Jewett, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 16/401,044

(22) Filed: May 1, 2019

(65) Prior Publication Data

US 2020/0347892 A1    Nov. 5, 2020

(51) Int. Cl.
*F16D 11/14* (2006.01)
*F16D 48/06* (2006.01)
*F16D 23/02* (2006.01)

(52) U.S. Cl.
CPC .............. *F16D 11/14* (2013.01); *F16D 23/02* (2013.01); *F16D 48/06* (2013.01); *F16D 2300/06* (2013.01); *F16D 2500/50296* (2013.01)

(58) Field of Classification Search
CPC .......... F16D 11/14; F16D 23/02; F16D 48/06; F16D 2300/06; F16D 2500/50296
See application file for complete search history.

(56) References Cited

U.S. PATENT DOCUMENTS

| | | | |
|---|---|---|---|
| 8,472,033 B2 * | 6/2013 | Takeda .................... | F01K 13/02 |
| | | | 356/614 |
| 9,200,528 B2 * | 12/2015 | Zheng ..................... | F01D 11/02 |
| 9,267,552 B2 * | 2/2016 | Boyes ..................... | F16D 13/12 |
| 9,435,217 B2 * | 9/2016 | Zheng ..................... | F01D 11/08 |
| 2002/0067789 A1 | 6/2002 | Wallace et al. | |
| 2009/0000272 A1 | 1/2009 | Cloft | |

* cited by examiner

Primary Examiner — Tinh Dang
(74) Attorney, Agent, or Firm — James Pemrick; Charlotte Wilson

(57) ABSTRACT

A clutch system configured to transmit torque between an input shaft and an output shaft. The clutch system includes a clutch. The clutch includes: an input portion disposed at an end of the input shaft; an output portion disposed at an end of the output shaft; a sliding component that slides axially between the input and output portions to engage the clutch; and swirl breaks. The input portion, the output portion, and the sliding component each comprises walls. The swirl breaks are affixed to a one of the walls.

20 Claims, 3 Drawing Sheets

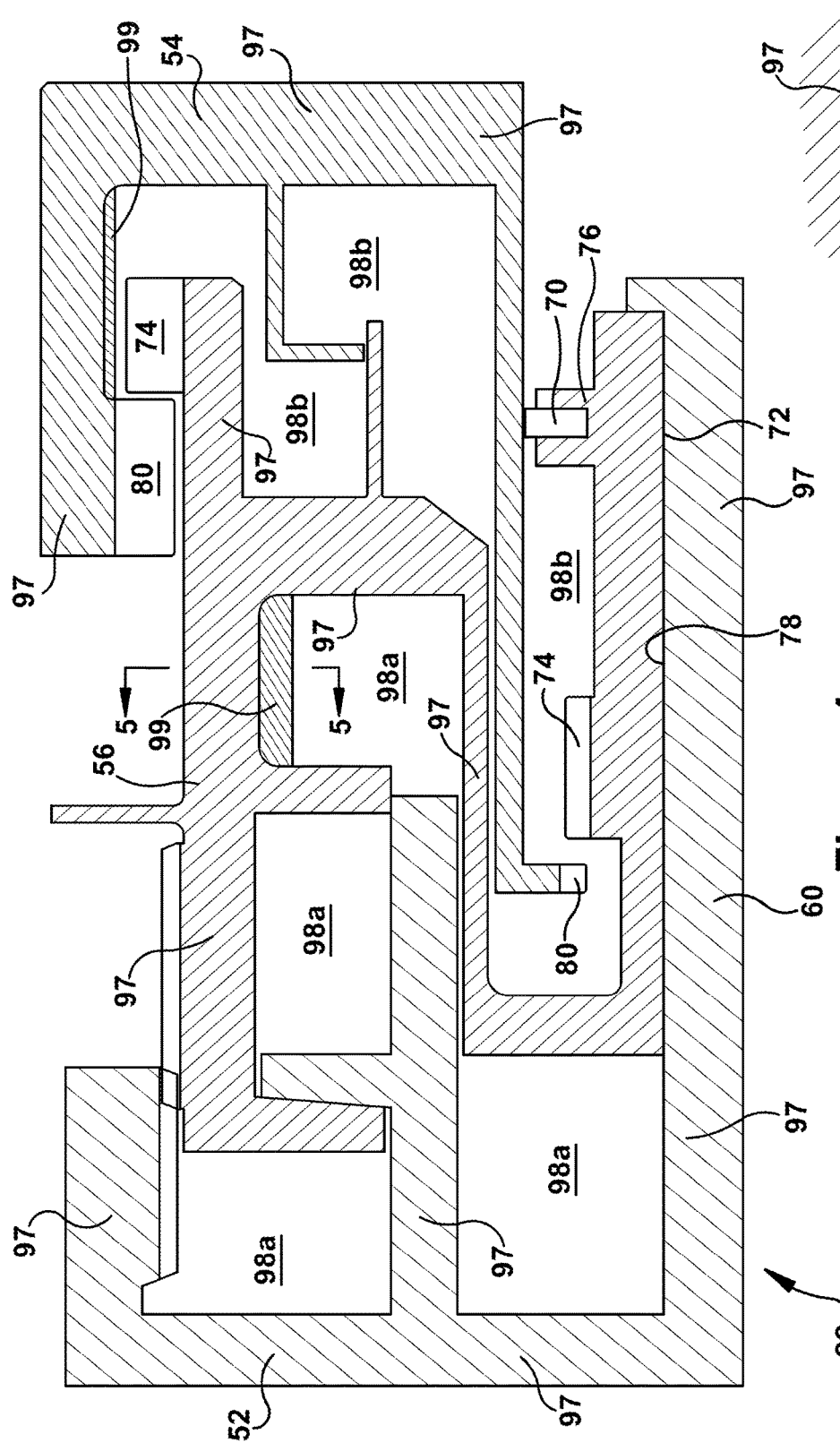

CLUTCH WITH SWIRL BREAKS

BACKGROUND OF THE INVENTION

The present invention relates to clutch lubrication. More specifically, but not by way of limitation, the present application relates to systems and apparatus related to lubricant swirl breaks in a clutch.

As will be appreciated, certain types of clutches, such as, for example, a synchronizing self-shifting (or "SSS") clutch, require a supply of lubricant during operation to perform in a desired way. In a SSS clutch, for example, proper operation includes meshing teeth at the instant when the speeds of an input shaft and an output shaft are synchronized. This is achieved in a SSS clutch precisely and without the possibility of error by means of the pawl actuated helical sliding motion. When the speeds of the shafts pass through synchronism, the pawls on one clutch element engage with ratchet teeth on the other clutch element and move a sliding component along helical splines, thereby engaging the driving and driven clutch teeth smoothly and positively.

To protect such mechanisms from undue wear and tear, a supply of lubricant is provided to the various components within the clutch. In conventional systems, however, the delivered lubricant can become entrapped within the various interior cavities of the clutch. Further, such systems are vulnerable to the rotating components inducing a swirling effect (or, as used herein, "swirl") upon the entrapped lubricant, which can incite harmful vibration and rotor-dynamic instability. Accordingly, current approaches for addressing lubricant swirl in clutches, particularly SSS clutches, are lacking in one or more respects.

BRIEF DESCRIPTION OF THE INVENTION

The present application thus describes a clutch system configured to transmit torque between an input shaft and an output shaft. The clutch system includes a clutch. The clutch includes: an input portion disposed at an end of the input shaft; an output portion disposed at an end of the output shaft; a sliding component that slides axially between the input and output portions to engage the clutch; and swirl breaks. The input portion, the output portion, and the sliding component each comprises walls. The swirl breaks are affixed to a one of the walls.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 4 shows a cross-sectional view of an SSS clutch having a swirl-inhibiting design according to embodiments of the present application; and FIG. 5 is a cross-sectional view along sight line 5-5 of FIG. 4 that shows an exemplary swirl break in accordance with the present application.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
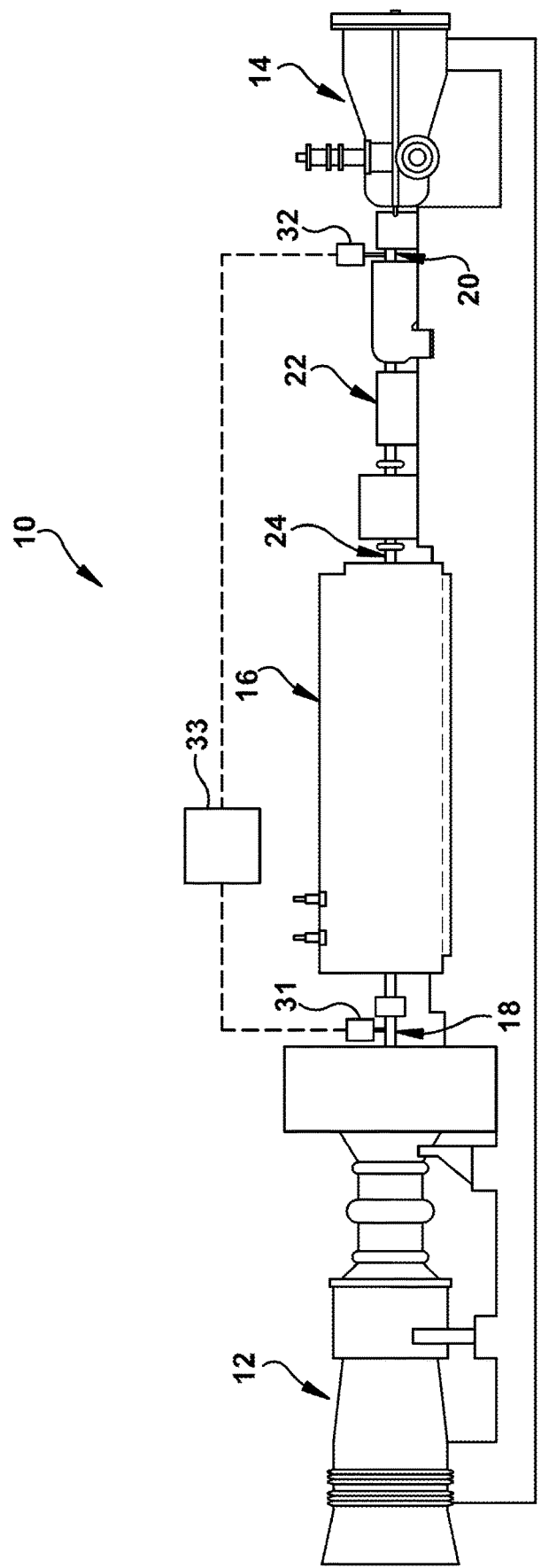
FIG. 1 is a schematic diagram of a combined cycle power plant that includes a clutch in accordance embodiments of the present application or within which embodiments of the present application may be practiced.

Referring now to FIG. 1, a combined cycle power plant (or "CCPP") 10 is shown that includes a clutch in accordance embodiments of the present application or within which embodiments of the present application may be practiced. The CCPP 10 includes a first machine comprising a gas turbine 12 and a second machine comprising a steam turbine 14, wherein the gas and steam turbines 12, 14 cooperate to provide work output to a generator 16 of the CCPP 10 for the production of electrical power. The gas turbine 12 may include conventional compression, combustion, and turbine sections, and the steam turbine 14 may include conventional condenser, boiler, and turbine sections. The configuration of each of these sections will be readily apparent to those having ordinary skill in the art and will not be specifically discussed herein.

The gas turbine 12 also includes a first rotatable shaft, also referred to herein as an output shaft 18, and the steam turbine 14 includes a second rotatable shaft, also referred to herein as an input shaft 20. A clutch 22 is provided to couple the output and input shafts 18, 20. When coupled together, the output and input shafts 18, 20 may be referred to herein as a combined shaft 24. As shown in FIG. 1, the combined shaft 24 is coupled to the generator 16 and drives the generator 16 for the production of electrical power in a manner that will be apparent to those having ordinary skill in the art. It should be appreciated that the usage of the clutch 22 in CCPP 10 is exemplary. For example, in accordance with the present disclosure, the clutch 22 may be used in marine propulsion applications. For example, the clutch 22 can be used between turbines or between turbines/diesel engines and the gearbox/propeller.

The clutch 22 may comprise a synchronizing self-shifting clutch (or "SSS") clutch, though, unless otherwise specified, other types of clutches may also be used. As described in more detail below, the SSS clutch 22 generally includes a number of gear teeth associated with each of the respective output and input shafts 18, 20, wherein the number of gear teeth for each shaft 18, 20 predicts the number of possible angular engagement positions in which the input shaft 20 can be coupled to the output shaft 18. As described herein, the clutch 22 engages the shafts 18, 20 under predetermined conditions to couple the shafts 18, 20 to form the combined shaft 24.

The CCPP 10 also includes first and second sensors 31, 32 for measuring operating parameters. For example, the first and second sensors 31, 32 may be positioned to monitor operating parameters associated with the respective output and input shafts 18, 20. The first and second sensors 31, 32 may comprise conventional vibration sensors configured to measure vibrational response of the input shaft 20 and output shaft 18, respectively. The first and second sensors 31, 32 may be communicatively connected to a controller 33, and the measurements collected by the first and second sensors 31, 32 may be sent to the controller 33 for use thereby.

Figure 2:
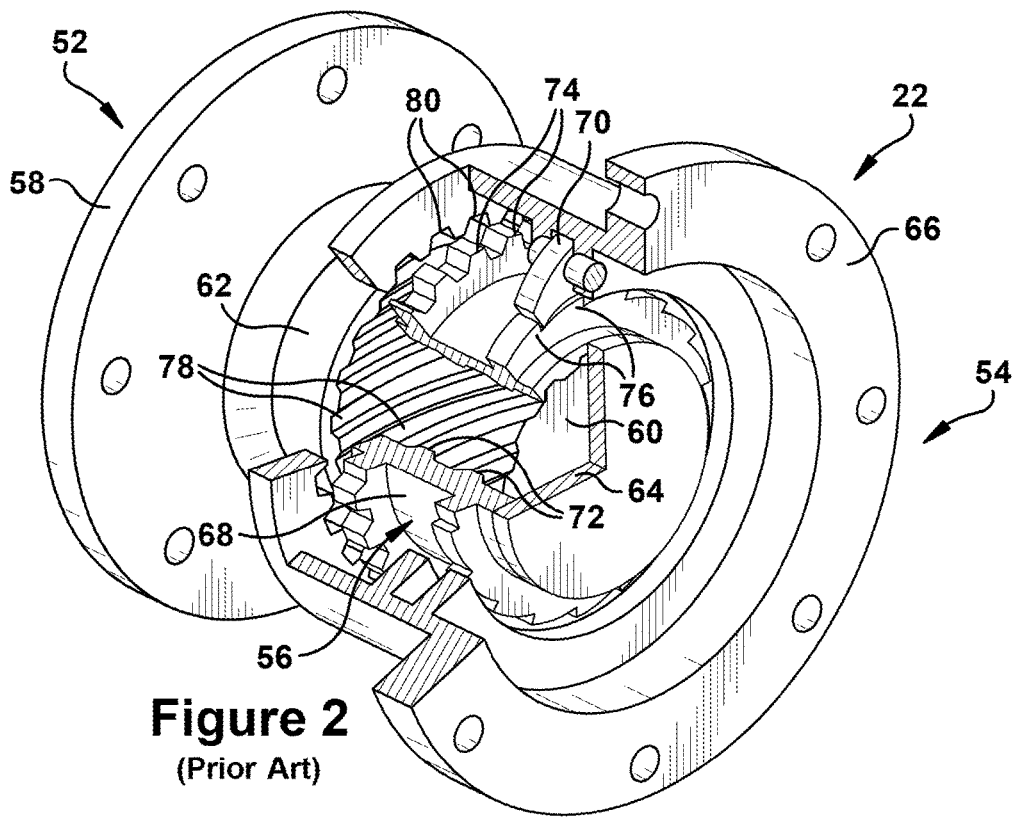
FIG. 2 is a partially cut-away isometric view of a synchro-self-shifting (SSS) clutch that can be employed in the system illustrated in FIG. 1.

For purposes of background and exemplary operation, an example SSS clutch 22 is illustrated in FIGS. 2 and 3. With specific reference to FIG. 2, the SSS clutch 22 generally includes an input portion 52 (which is positioned at one end of the input shaft 20 of FIG. 1), an output portion 54 (which is positioned at one end of the output shaft 18 of FIG. 1), and a sliding component 56. The input portion 52 includes an input coupling ring 58, an input extension 60, a proximal stop 62, and a distal stop 64. The output portion 54 includes an output coupling ring 66, an output clutch ring 68, and a pawl 70. The sliding component 56 includes internal helical splines 72, external clutch teeth 74, and external ratchet teeth 76. The input extension 60 is configured with external helical splines 78 extending between proximal and distal stops 62 and 64. The sliding component 56 is mounted on the input extension 60 between proximal and distal stops 62 and 64, so that the internal and external splines 72 and 78 matingly engage one another.

Figure 3A:
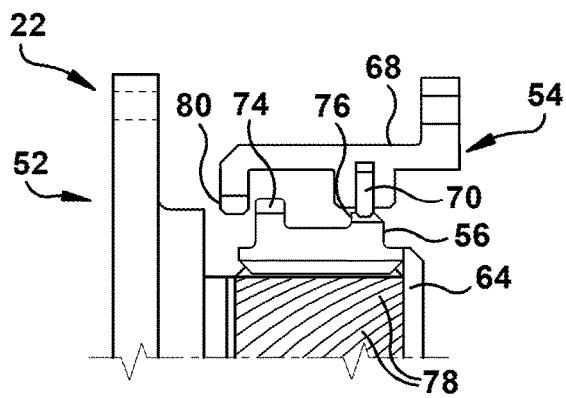
FIG. 3a is a partial sectional side view illustrating the SSS clutch of FIG. 2 in a disengaged configuration.

With reference to FIG. 3a, the SSS clutch 22 is shown in a disengaged configuration where the input extension 60 and the sliding component 56 rotate freely within the output clutch ring 68, and no torque is transmitted from the input portion 52 to the output portion 54. When the rotational speeds of the input extension 60 and the sliding component 56 reach the same speed as the output clutch ring 68, the ratchet teeth 76 of sliding component 56 contact the tip of the pawl 70 to prevent further rotation of the sliding component 56 relative to output clutch ring 68.

Figure 3B:
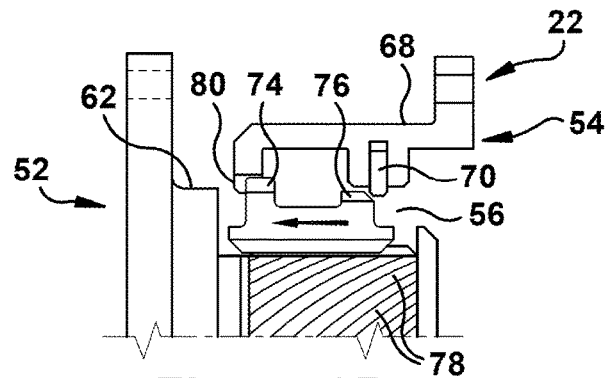
FIG. 3b is a partial sectional side view illustrating the SSS clutch of FIG. 2 in a transition configuration.

FIG. 3b shows the SSS clutch 22 in a transition configuration where the pawl 70 prevents rotation of the sliding component 56 relative to the output clutch ring 68, and the difference between the rotational speed of the output portion 54 and the input portion 52 causes the sliding component 56 to move axially along the external helical splines 78 of the input extension 60 toward the proximal stop 62. When one of the ratchet teeth 76 is in contact with the pawl 70, the external clutch teeth 74 of sliding component 56 are perfectly aligned for engagement with the internal clutch teeth 80 of the output clutch ring 68. As the sliding component 56 moves along the input extension 60, the pawl 70 passes out of contact with the ratchet teeth 76, allowing external and internal clutch teeth to come into flank contact and continue the engaging travel. Note that the only load on pawl 70 is that required to shift sliding component 56 along external helical splines 78.

Figure 3C:
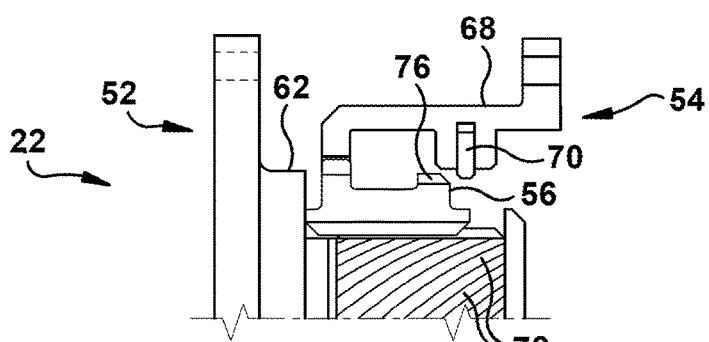
FIG. 3c is a partial sectional side view illustrating the SSS clutch of FIG. 2 in an engaged configuration.

FIG. 3c shows the SSS clutch 22 in an engaged configuration where the input portion 52 and output portion 54 are mechanically coupled to one another. Driving torque from the input portion 52 is only transmitted when the sliding component 56 completes its travel by contacting the proximal stop 62, with the internal and external clutch teeth 80, 74 completely engaged and the pawl 70 unloaded. Similar to when a nut is screwed against the head of a bolt, no external thrust is produced when the sliding component 56 reaches the proximal stop 62. If the rotational speed of the input portion 52 is reduced relative to the output portion 54, the torque on the helical splines 78 will reverse. This causes the sliding component 56 to automatically return to the disengaged configuration shown in FIG. 3a.

With reference to FIG. 4, systems and apparatus of the present application are disclosed for reducing or eliminating lubricant swirl within a clutch. Conventional clutches may use oil or lubricant (referred to herein generally as "lubricant") as a means of cooling and lubricating internal mechanisms (e.g., gear teeth, splines, etc.). As will be appreciated, conventional clutches, for example SSS clutches, have a configuration that creates several internal cavities where lubricant may accumulate and become entrapment during normal operation. Lubricant entrapped in this manner may form a swirling layer due as interaction with rotating components of the clutch. The swirling layer of lubricant, however, rotates at a slower speed than the adjacent rotating surfaces and this can cause non-synchronous excitation. When the swirling lubricant becomes a uniform layer, the imbalanced forces caused by it can increase significantly and excite harmful vibrations. In accordance with the present invention, as will be seen, certain features—referred to herein as "swirl breaks"—are installed within the interior spaces or cavities of the clutch where lubricant becomes entrapped and/or swirling layers of lubricant form. The swirl breaks are configured to break up the swirling layer of lubricant so that it does not become uniform. In this way, the swirl breaks disrupt the layer of lubricant so to prevent the type of imbalances that lead to the harmful vibration.

With specific reference now to FIG. 4, a sectional view of a SSS clutch 22 is provided in accordance with embodiments of the present application. As will be appreciated, the SSS clutch 22 is configured to transmit torque between an input shaft and an output shaft, e.g., the input and output shafts 20, 18 of FIG. 1. The SSS clutch 22 generally includes the same or analogous components as the example SSS clutch discussed above in relation to FIGS. 2 and 3. It should be understood that the like components have been labeled using the same reference numerals. Thus, the SSS clutch 22 of FIG. 4 generally includes an input portion 52 disposed at an end of an input shaft (e.g., the input shaft 20 of FIG. 1), an output portion 54 disposed at an end of the output shaft (e.g., the output shaft 18 of FIG. 1), and a sliding component 56. The sliding component 56 slides axially between the input and output portions 52, 54 to engage the SSS clutch 22.

In describing the positioning of the swirl breaks, it may be helpful to first describe and define certain interior chambers of the SSS clutch 22 within which the swirl breaks are designed to function. With this in mind, it will be appreciated that the SSS clutch 22 is formed via an assembly of several interconnecting structural walls, which will be generally referenced herein as "walls" 97. As the sectional view of FIG. 4 illustrates, the walls 97 form the basic structure of each the three major clutch components—i.e., the input portion 52, the output portion 54, and the sliding component 56. It should be understood that each of these major components generally includes several of the walls 97, which, all together, form the overall structure of the SSS clutch 22. Now, given the configuration and manner in which a SSS clutch operates, the walls 97 necessarily form several internal cavities or, as referred to herein, "chambers" 98. Thus, it should be appreciated that—at least for descriptive purposes—each of the several indicated chambers 98 with SSS clutch 22 is formed by or enclosed within a plurality of the walls 97, and that each of these walls 97 is a part of either the input portion 52, output portion 54, or sliding component 56 of the SSS clutch 22. As further indicated in FIG. 4, the chambers 98 can be further characterized by the particular walls 97 that define them. Thus, a first type of chamber or "first chamber type"—referenced in FIG. 4 as "98a"—includes the chambers enclosed by walls 97 belonging to the input portion 52 and sliding component 56. And, a second type of chamber or "second chamber type"—referenced in FIG. 4 as "98b"—includes the chambers enclosed by the walls 97 belonging to the output portion 54 and sliding component 56.

As illustrated in FIG. 4, exemplary embodiments of the present application include a clutch, for example, a SSS clutch, having one or more swirl breaks 99. For example, as shown, the one or more swirl breaks 99 may be disposed in one or more of the chambers 98 and attached to one or more of the walls 97 in the SSS clutch 22. As described above, the chambers 98 of the SSS clutch 22 may include one or more first chamber types 98a, which are each enclosed by walls 97 belonging to the input portion 52 and the sliding component 56. Exemplary embodiments include the swirl breaks 99 being positioned in one or more of the first chamber types 98a of the SSS clutch 22. The chambers 98 of the SSS clutch 22 also may include one or more second chamber types 98b, which are each enclosed by walls 97 belonging to the output portion 54 and the sliding component 56. As illustrated, exemplary embodiments include the swirl breaks 99 being positioned in one or more of the second chamber types 98b of the SSS clutch 22.

In regard to the walls 97, exemplary embodiments include the swirl breaks 99 being formed on one or more walls 97 belonging to the input portion 52, the output portion 54, and/or the sliding component 56 of the clutch 22. In accordance with the illustrated example of FIG. 4, the swirl breaks 99 may be attached to one or more of the walls 97 belonging to the output portion 54 and the sliding component 56 of the clutch 22. A preferred embodiment includes swirl breaks 99 attached to at least one of the walls 97 of both the output portion 54 and the sliding component 56 of the clutch 22.

Additionally, in accordance with preferred embodiments, the swirl breaks 99 may be formed or attached to particular walls 97 of the SSS clutch 22. For example, as illustrated, the swirl breaks 99 may be formed on the axially oriented walls 97 of the clutch 22 that form the outer radial boundary of one of the chambers 98. Thus, as shown, there is a swirl break 99 attached to an axial oriented wall 97 of the output portion 54 that forms the outer radial boundary of a chamber 98. And, as also shown, there is another swirl break 99 attached to an axial oriented wall 97 of the sliding component 56 that forms the outer radial boundary of another chamber 98. It will be appreciated that, in operation, the chambers 98 become filled or partially filled with lubricant. Because of the high-speed rotation of the SSS clutch 22, the lubricant is forced away from the axis of rotation due to centrifugal force. In this way, lubricant may become entrapped within the chambers 98. As described, this can create forces and/or imbalances within the rotating system that causes vibration, which can increase wear to the clutch and system components and/or limit or prohibit operation of the CCPP. Pursuant to exemplary embodiments, this condition is ameliorated via the interaction of the lubricant with the swirl breaks 99 given the positioning of the swirl breaks 99 on the outer radial wall 97 of the chamber 98.

With reference also to FIG. 5, a cross-sectional view of an exemplary swirl break 99 is provided in accordance with the present application. It should be appreciated that the swirl breaks 99 can take different forms and geometries depending on the shape of the particular chamber in which the swirl breaks 99 are located. In accordance with a preferred embodiment, the swirl break 99 takes the form of a fin. Though other shapes are possible, the fin of the swirl break 99 may have an approximate rectangular shape, with swirl break 99 being positioned so that the height of the fin is defined in the radial direction, the length of the fin being defined in the axial direction, and the thickness of the fin being defined in the circumferential direction (with all directions defined with respect to the axis of rotation of the clutch 22). As illustrated, the height of the swirl break 99 may be constant within a particular chamber 98, though the height of swirl breaks 99 within different chambers 98 may differ. Though other configurations are possible, as shown, the swirl break 99 may extended lengthwise between structure that defines the axial length of the cavity. The lengthwise axis of the swirl break 99 may align with the axial direction (with respect to the axis of rotation of the clutch 22) or may be slightly canted in relation thereto. The thickness of the swirl break 99 may be narrow relative to both its height and length. Further, the swirl breaks 99 may be positioned at regular intervals about the circumference of the clutch 22. For example, between 4 and 20 swirl breaks 99 may be positioned at regular circumferential intervals within a particular chamber 98.

In operation, the swirl breaks of the present application may be used improve rotor-dynamic stability by disrupting lubricant swirl in clutches, particularly in SSS clutches. As stated, entrapped lubrication within the interior of a clutch generally causes operational issues, including harmful vibrations, which can have long-term detrimental effects and increased wear to clutch mechanisms. If left unchecked, entrapped lubrication can swirl about in a uniform layer that creates imbalances sufficient to excite natural frequencies. As provided above, the swirl breaks of the present invention provide a cost-effective way to address this issue. Specifically, the swirl breaks of the present invention may be efficiently implemented with few modifications to the design of the overall clutch system. The modifications that are needed are relatively minor in scope, yet, upon implementation, ensure the swirling lubricant layer is reduced during operation. Specifically, the swirl breaks of the present application disrupt the layer of lubricant as it forms inside of the clutch and, thereby, prevent it from having the uniformity necessary to induce forces sufficient for instability.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A clutch system configured to transmit torque between an input shaft and an output shaft, the clutch system comprising:
   a clutch comprising:

an input portion disposed at an end of the input shaft;
an output portion disposed at an end of the output shaft;
a sliding component that slides axially between the input and output portions to engage the clutch; and
swirl breaks;
wherein the input portion, the output portion, and the sliding component each comprises walls;
wherein the swirl breaks are affixed to one or more of the walls.

2. The clutch system according to claim 1, wherein the clutch comprises a synchronizing self-shifting ("SSS") clutch.

3. The clutch system according to claim 2, wherein the clutch comprises one or more chambers, each of the one or more chambers being enclosed by the walls of at least two of: the input portion; the output portion; and the sliding component.

4. The clutch system according to claim 3, wherein the one or more chambers of the clutch include a first chamber type that is enclosed by the walls of the input portion and the walls of the sliding component; and
wherein the swirl breaks are disposed in a first chamber of the first chamber type.

5. The clutch system according to claim 4, wherein the swirl breaks are affixed to a one of the walls that defines an outer radial boundary of the first chamber; and
wherein the swirl breaks are spaced at circumferential intervals.

6. The clutch system according to claim 4, wherein the swirl breaks are affixed to a one of the walls of the sliding component.

7. The clutch system according to claim 4, wherein a number of the swirl breaks are positioned at regular circumferential intervals within the first chamber, and the number is between 4 and 20.

8. The clutch system according to claim 3, wherein the one or more chambers of the clutch include a second chamber type that is enclosed by the walls of the output portion and the walls of the sliding component; and
wherein the swirl breaks are disposed in a second chamber of the second chamber type.

9. The clutch system according to claim 8, wherein the swirl breaks are affixed to a one of the walls that defines an outer radial boundary of the second chamber; and
wherein the swirl breaks are spaced at circumferential intervals.

10. The clutch system according to claim 8, wherein the swirl breaks are affixed to a one of the walls of the output portion.

11. The clutch system according to claim 8, wherein a number of the swirl breaks are positioned at regular circumferential intervals within the second chamber, and the number is between 4 and 20.

12. The clutch system according to claim 3, wherein the one or more chambers of the clutch include a first chamber type, which is enclosed by the walls of the input portion and the walls of the sliding component, and a second chamber type, which is enclosed by the walls of the output portion and the walls of the sliding component; and
wherein the swirl breaks are disposed in a first chamber of the first chamber type and a second chamber of the second chamber type.

13. The clutch system according to claim 12, wherein some of the swirl breaks are affixed at circumferential intervals to a one of the walls that defines an outer radial boundary of the first chamber; and
wherein some of the swirl breaks are affixed at circumferential intervals to a one of the walls that defines an outer radial boundary of the second chamber.

14. The clutch system according to claim 12, wherein some of the swirl breaks are affixed to a one of the walls of the sliding component; and
wherein some of the swirl breaks are affixed to a one of the walls of the output portion.

15. The clutch system according to claim 14, wherein a number of the swirl breaks are affixed to the one of the walls of the sliding component, and the number is between 4 and 20; and
wherein a second number of the swirl breaks is affixed to the one of the walls of the output portion, and the second number is between 4 and 20.

16. The clutch system according to claim 3, wherein the swirl breaks are affixed to a one of the walls that defines an outer radial boundary of one of the chambers; and
wherein the swirl breaks are spaced at circumferential intervals within the one of the chambers; and
wherein each of the swirl breaks comprises a fin.

17. The clutch system according to claim 16, wherein the fin comprises an rectangular shape in which, relative to an axis of rotation of the clutch:
a height of the fin is defined in a radial direction;
a length of the fin is defined in a axial direction; and
a thickness of the fin is defined in a circumferential direction;
wherein, relative to an axis of rotation of the clutch, the fin extends lengthwise in a direction that aligns with an axial direction.

18. The clutch system according to claim 16, wherein the fin comprises an rectangular shape in which, relative to an axis of rotation of the clutch:
a height of the fin is defined in a radial direction;
a length of the fin is defined in a axial direction; and
a thickness of the fin is defined in a circumferential direction;
wherein, relative to an axis of rotation of the clutch, the fin extends lengthwise in a direction that is canted in relation to an axial direction.

19. A system comprising:
a steam turbine that drives an input shaft;
a gas turbine that drives an output shaft; and
a synchronizing self-shifting ("SSS") clutch configured to transmit torque between the input shaft and the output shaft, the SSS clutch comprising:
an input portion disposed at an end of the input shaft;
an output portion disposed at an end of the output shaft;
a sliding component that slides axially between the input and output portions to engage the SSS clutch; and
swirl breaks;
wherein the input portion, the output portion, and the sliding component each comprises walls;
wherein the swirl breaks are affixed to one or more of the walls.

20. The system according to claim 19, wherein the SSS clutch comprises a chamber defined by the walls;
wherein the swirl breaks are affixed to a one of the walls that defines an outer radial boundary of the chamber; and
wherein the swirl breaks are spaced at circumferential intervals.

* * * * *